US010198661B2

(12) United States Patent
Kleinman

(10) Patent No.: US 10,198,661 B2
(45) Date of Patent: *Feb. 5, 2019

(54) SYSTEM FOR DETERMINING ALIGNMENT OF A USER-MARKED DOCUMENT AND METHOD THEREOF

(71) Applicant: Daniel Kleinman, Washington, DC (US)

(72) Inventor: Daniel Kleinman, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/405,942

(22) Filed: Jan. 13, 2017

(65) Prior Publication Data
US 2017/0147902 A1 May 25, 2017

Related U.S. Application Data

(63) Continuation of application No. 15/010,888, filed on Jan. 29, 2016, now Pat. No. 9,582,728, which is a
(Continued)

(51) Int. Cl.
| | |
|---|---|
| G06K 9/62 | (2006.01) |
| G06K 5/04 | (2006.01) |
| G06K 9/20 | (2006.01) |
| G06K 9/32 | (2006.01) |
| G06K 9/18 | (2006.01) |
| H04N 5/225 | (2006.01) |
| G06T 7/90 | (2017.01) |
| G06K 9/00 | (2006.01) |
| G06T 5/00 | (2006.01) |
| G06T 19/00 | (2011.01) |
| H04N 5/232 | (2006.01) |

(52) U.S. Cl.
CPC ............ *G06K 9/6202* (2013.01); *G06K 5/04* (2013.01); *G06K 9/00449* (2013.01); *G06K 9/18* (2013.01); *G06K 9/20* (2013.01); *G06K 9/3216* (2013.01); *G06T 5/003* (2013.01); *G06T 7/90* (2017.01); *G06T 19/006* (2013.01); *H04N 5/225* (2013.01); *H04N 5/23293* (2013.01)

(58) Field of Classification Search
CPC .. G06K 9/00449; G06K 9/6202; G06K 9/228; G06K 9/72; G06T 7/90; G06T 5/003; G06T 19/006; H04N 5/23293
USPC .......................................... 382/154, 181, 218
See application file for complete search history.

(56) References Cited

U.S. PATENT DOCUMENTS

| | | | | |
|---|---|---|---|---|
| 5,418,865 A | * | 5/1995 | Bloomberg | .......... G06K 9/2054 235/456 |
| 6,854,644 B1 | * | 2/2005 | Bolton | ..................... G06K 9/50 235/375 |

(Continued)

*Primary Examiner* — Daniel G Mariam
(74) *Attorney, Agent, or Firm* — Law Office of Jerry Joseph, PLC; Jerry K. Joseph

(57) ABSTRACT

A system for evaluating a user-marked document having a response area and at least one image marker, the system including an image capturing device to obtain a digital image of the user-marked document, and a computer to identify positional information of the at least one image marker from the obtained digital image of the user-marked document, wherein the image marker provides context to marks on the user-marked document based on the position of the mark relative to the image marker.

17 Claims, 14 Drawing Sheets

Related U.S. Application Data continuation of application No. 13/844,808, filed on Mar. 16, 2013, now Pat. No. 9,280,691.

(60) Provisional application No. 61/618,262, filed on Mar. 30, 2012.

(56) References Cited

U.S. PATENT DOCUMENTS

| | | | |
|---|---|---|---|
| 7,791,756 B2* | 9/2010 | Cui | G06K 9/00442 358/1.15 |
| 8,336,779 B1* | 12/2012 | Porter | G06K 9/6253 235/462.1 |
| 2011/0170144 A1* | 7/2011 | Sankarasubramaniam | G06K 9/2063 358/3.28 |
| 2011/0235128 A1* | 9/2011 | Sisco | H04N 1/32133 358/3.28 |
| 2014/0247965 A1* | 9/2014 | Van Wesep | G09B 7/06 382/103 |

* cited by examiner

RELATED ART

SYSTEM FOR DETERMINING ALIGNMENT OF A USER-MARKED DOCUMENT AND METHOD THEREOF

CROSS-REFERENCE TO RELATED APPLICATIONS

This application is a continuation of prior application Ser. No. 15/010,888, filed on Jan. 29, 2016, in the U.S. Patent and Trademark Office, now pending, which claims the benefit of U.S. Pat. No. 9,280,691, issued on Mar. 8, 2016, and U.S. Provisional Patent Application No. 61/618,262, filed on Mar. 30, 2012, the disclosures of which are incorporated herein in their entirety by reference.

BACKGROUND OF THE INVENTION

1. Field of the Invention

The present general inventive concept relates to a method of determining alignment of a document for optical mark recognition ("OMR"), and more particularly to a method of determining alignment of a user-marked document for OMR using a non-fixed image capturing device. The present general inventive concept also relates to a method of aligning a user-marked document for OMR using a non-fixed image capturing device, without requiring a de-skewing process.

2. Description of Related Art

Optical Mark Recognition (OMR) technology has been in use for decades. OMR is used to extract intended data from marked fields, such as check boxes and fill-in fields, on scanned forms or other documents. However, conventional OMR methods require that the scanner or camera be parallel to the document to be read.

Over the past few years, mobile device technology has significantly improved allowing for powerful smart phone devices with integrated digital cameras and various other devices. However, there exists a problem in accurately identifying marked areas on scanned forms or other documents when using a non-fixed image capture device, having a relatively low resolution.

That is, current OMR technology is limited to being only able to read pre-defined (i.e., fixed, parallel) positions relative to the scanned form, generally using a border or "broken ladder" marks around the form for alignment.

In order to identify the locations of the marks, prior techniques have manipulated the captured image, de-skewing the image in two dimensions prior to analyzing the page. However, this method only works well when the position of the camera and the page are both on the same plane, such as in the case of a desktop scanner or when using a fixed-position document camera.

FIG. 1 illustrates a perspective view of a conventional optical marker reader ("OMR") system 10. The OMR system 10 includes a camera or scanning device 5 which is fixed relative to a document 25 to be read. In order to function, the conventional OMR systems 10 require that the camera or scanning device 5 be parallel to the document 25 since the system 10 cannot effectively compensate for varying document to camera angles.

Conventionally, identification of areas on the document has been done by first detecting a border around the document or a series of marks around the boundary of the page. In addition, a time-consuming de-skewing technique must also be applied in order for the conventional OMR technique to accurately identify and recognize marked fields. Typically, the de-skewing process reshapes an image of the document using its border, which is stretched and/or resized to match a predefined rectangular shape. Only then can the marks on the document be analyzed relative to that de-skewed page boundary.

However, the conventional OMR techniques are inadequate when applied using non-fixed capture devices, such as hand held cameras or mobile devices having a lower resolution, since the camera angles with respect to the document vary causing blurred captured images which can not be properly compensated for when analyzed for marked data fields. Conventional techniques are further complicated by lens distortion and general page curl.

Therefore, what is needed is an improved OMR technique which can accurately identify and analyze marked data fields using low resolution non-fixed cameras, without requiring a de-skewing process.

SUMMARY OF THE INVENTION

The present general inventive concept provides a system for aligning a user-marked document for optical mark recognition ("OMR"), and more particularly to a method for aligning a user-marked document for OMR using a non-fixed image capturing device Additional aspects of the present general inventive concept will be set forth in part in the description which follows and, in part, will be obvious from the description, or may be learned by practice of the general inventive concept.

The foregoing and/or other aspects of the present general inventive concept may be achieved by providing a method for determining alignment of a user-marked document for optical mark recognition, wherein the user-marked document includes at least one image marker which includes capturing an image of a user-marked document including at least one image marker and at least one user-created mark with an image capturing device, identifying a spatial location of the image marker relative to the image capturing device and converting the identified spatial location coordinates of a plane of the image marker to location of pixels within the captured image.

The spatial location may include three-dimensional space.

The converting of the identified spatial location coordinates of the image marker may occur without de-skewing the captured image.

The image capturing device may include a smartphone having an image capturing device.

The method may further include determining an orientation of the image-capturing device relative to the user-marked document when capturing an image of the user-marked document using the captured image.

The method may further include locating a position of the at least one user-created mark using the captured image and the determined orientation of the image capturing device relative to the user-marked document.

The method may further include determining whether the position of the at least one user-created mark corresponds with a predefined template having defined correct marks and defined incorrect marks.

The at least one user-created mark may be identified as correct when corresponding to a defined correct mark and as incorrect when corresponding to a defined incorrect mark.

The foregoing and/or other aspects of the present general inventive concept may also be achieved by providing a method for identifying mark position on a document having a response area and an image marker which includes generating a document including a response area and at least one image marker, obtaining a digital image of the document including a user-mark in the response area, identifying a three dimensional position of the at least one image marker from the digital image, calculating a position of the response area in the digital image using the identified three-dimensional position of the at least one image marker, and identifying a position of the user-mark using the identified three dimensional position of the at least one image marker.

The calculating the position of the response area in the digital image may include determining an orientation of the document when the digital image of the document was obtained using the identified three-dimensional position of the at least one image marker.

The foregoing and/or other aspects of the present general inventive concept may also be achieved by providing a system for evaluating a user-marked document which includes a user-marked response sheet having a response area and at least one image marker, a means for obtaining a digital image of the user-marked response sheet, a computer having programming to perform steps including identifying three-dimensional position information of the at least one image marker in an obtained digital image, calculating position information of the response area in an obtained digital image using the three-dimensional position information of the at least one image marker, identifying position information of a user created mark within the response area using the calculated position information of the response area, and evaluating whether the position information of the user created mark corresponds with position information of a first predefined mark or a second predefined mark.

The means for obtaining a digital image of the user-marked response sheet may include a fixed image-capturing device and a non-fixed image-capturing device.

The first predefined mark may correspond with a correct response and the second predefined mark may correspond to an incorrect response.

The system may further include augmenting the obtained image by overlaying the user created mark by a first indicator when corresponding to the first predefined mark and by a second indicator when corresponding to the second predefined mark.

The first indicator may be selected from a group consisting of a circle, a numerical value, a check mark, or another geometric shape.

The second indicator may be selected from a group consisting of an "X" mark, a numerical value, or another geometric shape.

The system may further include overlaying an obtained image with the user created mark displayed in a first color when corresponding to the first predefined mark and in a second color when corresponding to the second predefined mark.

The foregoing and/or other aspects of the present general inventive concept may also be achieved by providing a system for evaluating a user-marked document having a response area and at least one image marker, the system including an image capturing device to obtain a digital image of the user-marked document, and a computer to identify positional information of the at least one image marker from the obtained digital image of the user-marked document, wherein the image marker provides context to marks on the user-marked document based on the position of the mark relative to the image marker.

The image marker may provide context to marks on the user-marked document based on the position of the mark relative to the image marker in 3-dimensional space.

The context may include one of position information of the response area, information data of a user of the user-marked document, and information data of the user-marked document. However, the present general inventive concept is not limited thereto.

The at least one image marker may includes one of an image, a pattern, a symbol, a number, a border, or one or more text characters. However, the present general inventive concept is not limited thereto.

The positional information of the image marker may include position, size, location, and/or plane of the image marker in space (e.g., 3-dimensional space) relative to the image capturing device. However, the present general inventive concept is not limited thereto.

The computer may determine a camera angle at which the digital image of the user-marked document was obtained based on a relative distortion of the image marker.

The positional information of the at least one image marker may be determined based on a pattern within the image marker.

The computer may identify pixel-value data of marks within the response area.

The computer may calculate positions of the marks relative to the image marker based on the marks position in 3-dimensional space.

The system for evaluating a user-marked document having a response area and at least one image marker may further include an algorithm stored within the computer to convert coordinates of the plane of the image marker to location of pixels within the obtained digital image of the user-marked document.

The calculated positions of the marks relative to the image marker may correspond to user data response to survey questions.

The computer may determine a presence, darkness or a color of marks within the response area based on the identified pixel-value data of the marks.

The computer may further augment the obtained digital image of the user-marked document with a color corresponding to the identified pixel-value data of the marks.

The image capturing device may display an augmented reality view of the obtained digital image of the user-marked document overlaid with the color corresponding to the identified pixel-value data of the marks within the response area. The color corresponding to the identified pixel-value data may be similar or identical to the mark disposed on the user-marked document. For instance, a user may mark an image of an apple on a user-marked document with a purple color. In the present invention, the computer would determine that the pixel-value data of the marked apple corresponds to a purple color and therefore the computer would display an augmented view of the apple having the same or similar purple color. However, the present general inventive concept is not limited thereto.

The computer may further augment the obtained digital image of the user-marked document with an image corresponding to the identified pixel-value data of the marks.

The image capturing device may display an augmented reality view of the obtained digital image of the user-marked document overlaid with a 3-D rendering corresponding to the identified pixel-value data of the marks within the response area.

The system may further include a gyroscope to determine a camera angle between the image capturing device and the image marker.

The image capturing device may obtain the digital image of the user-marked document when the camera angle is determined by the gyroscope to be stable to reduce image blur.

The computer may compares frames of the digital image obtained by the image capturing device to detect and reduce image blur.

BRIEF DESCRIPTIONS OF THE DRAWINGS

These and/or other aspects of the present general inventive concept will become apparent and more readily appreciated from the following description of the embodiments, taken in conjunction with the accompanying drawings of which:

Figure 13:
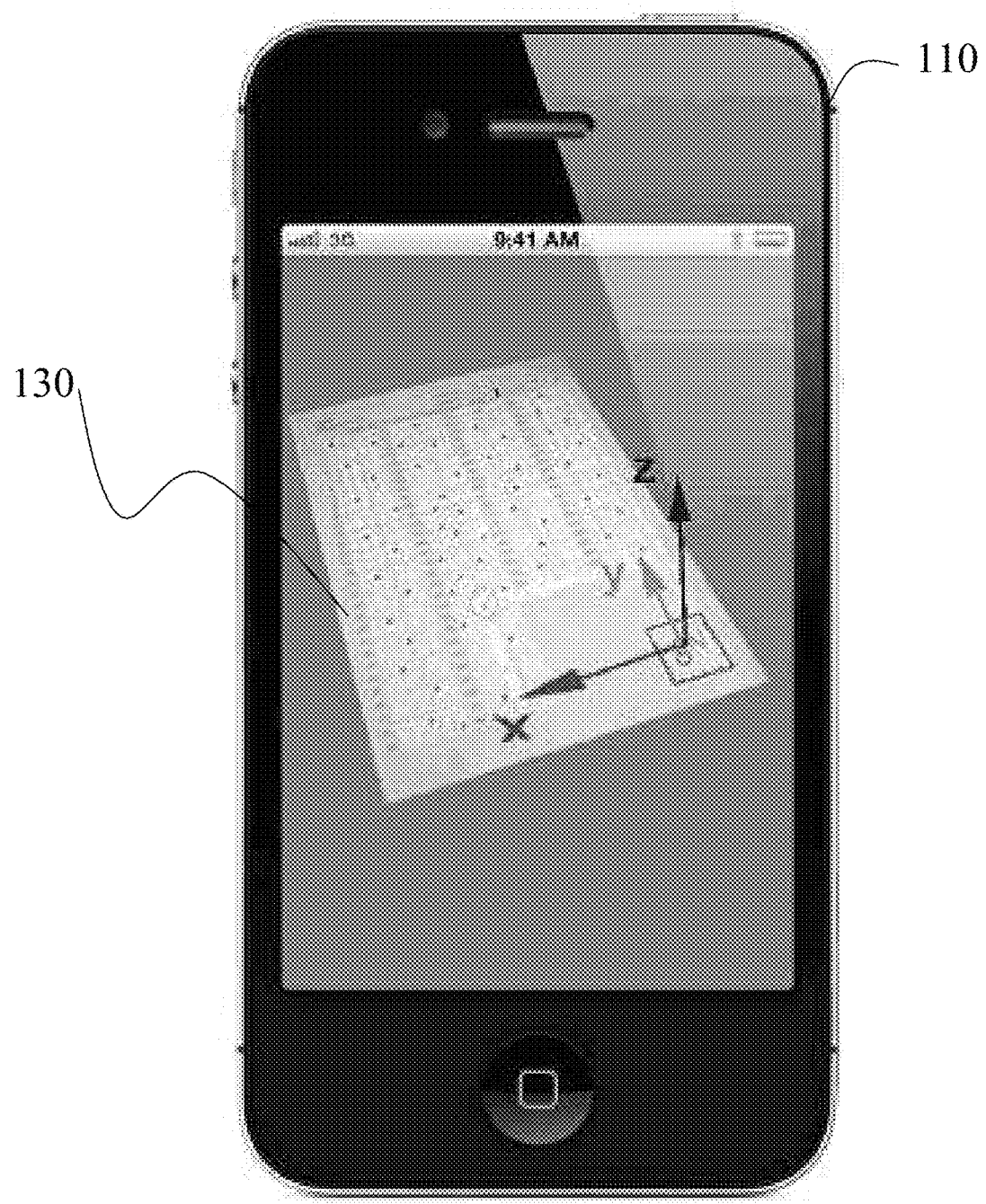
Figure 14:
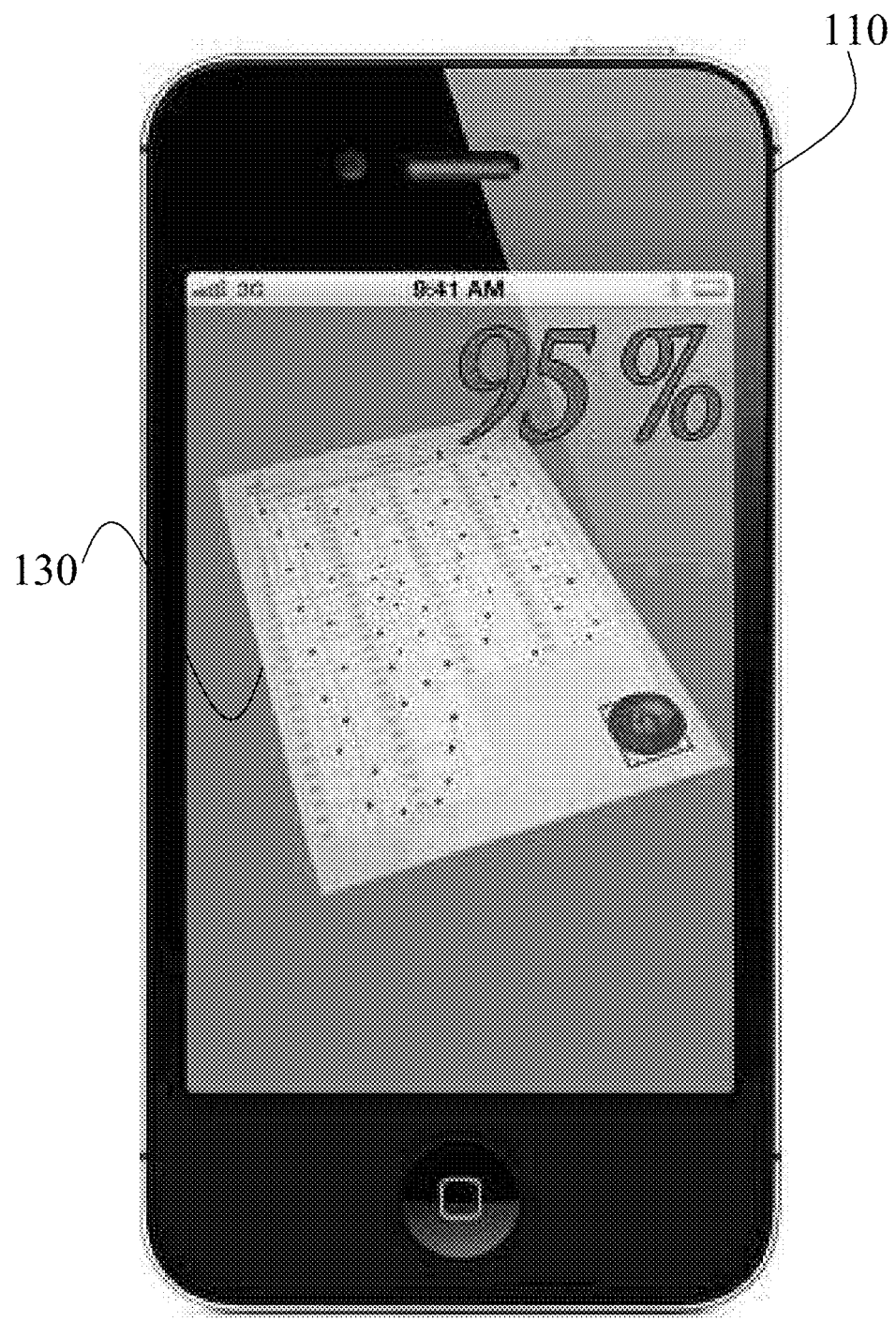

FIG. 13 illustrates identification of the orientation of an image marker in 3-dimensions on an image capture device according to an exemplary embodiment of the present general inventive concept; and FIG. 14 illustrates results using the position of the image marker to translate a location on the 3-dimensional plane into pixel coordinates of the image capture screen to analyze the marked data on the user-marked response sheet.

DETAILED DESCRIPTION

Reference will now be made in detail to the exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

The present general inventive concept relates to a method of aligning a user-marked document for optical mark recognition ("OMR"), and more particularly to a method of aligning, reading, and analyzing a user-marked document for OMR using a fixed or non-fixed image capturing device.

Figure 1:
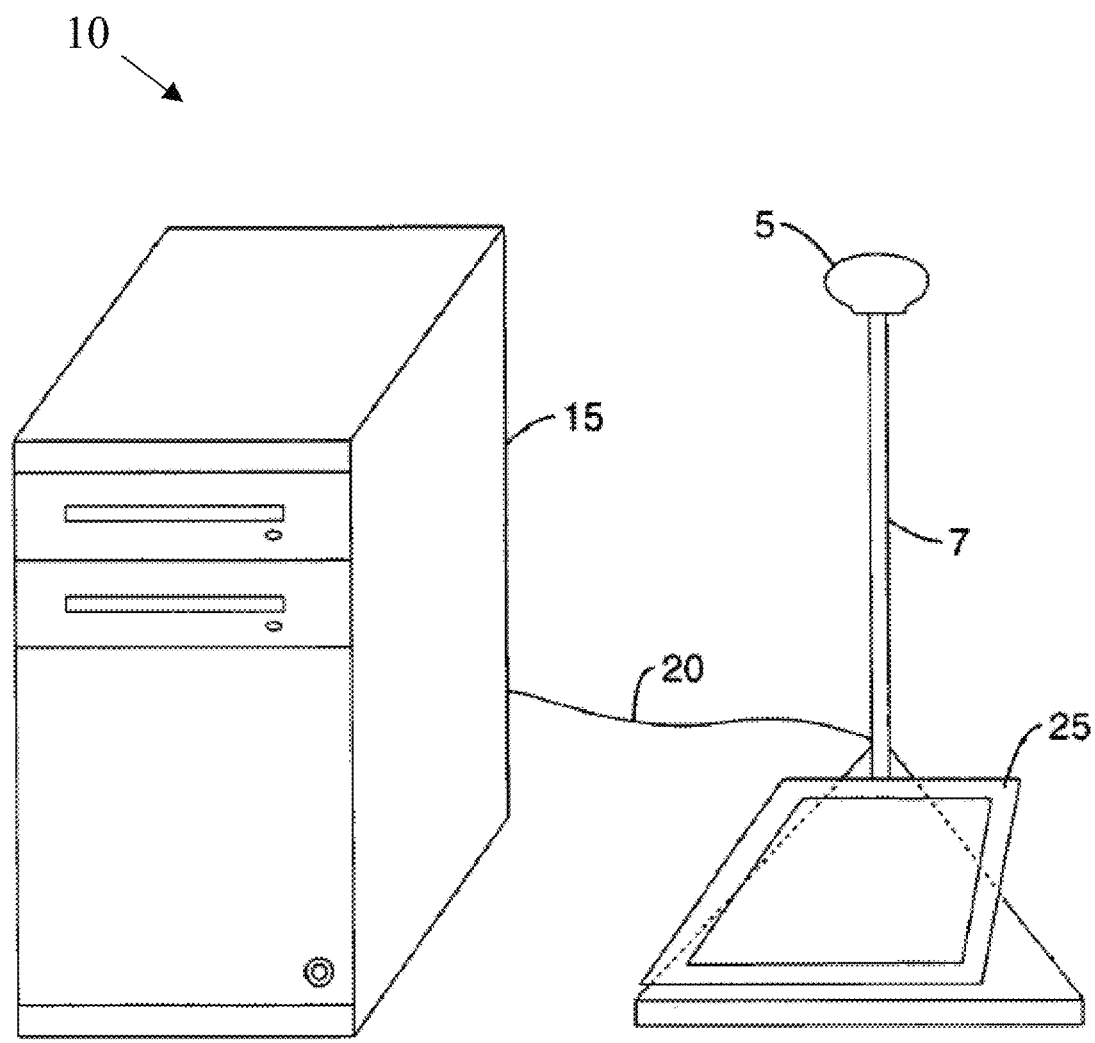
FIG. 1 illustrates a perspective view of a conventional optical marker reader ("OMR") system.
Figure 2:
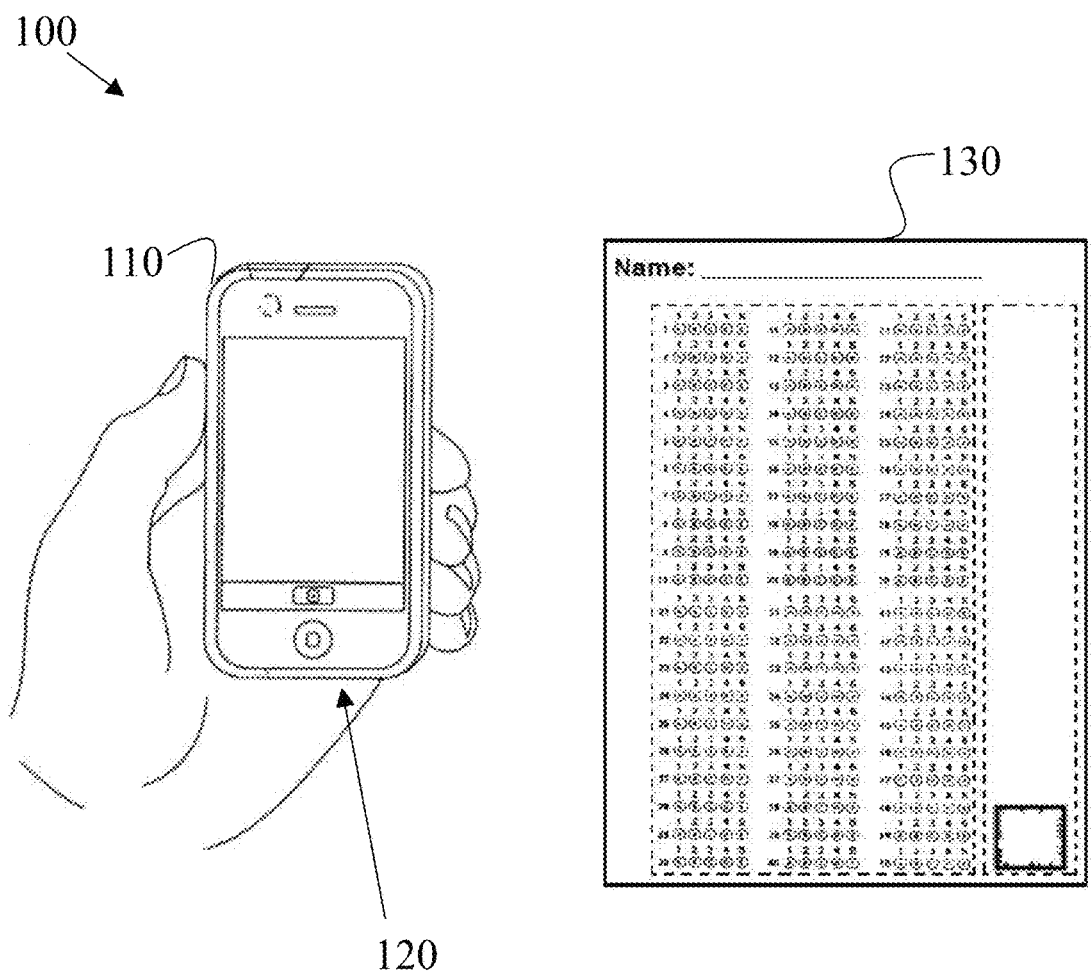
FIG. 2 illustrates a front perspective view of a non-fixed optical mark recognition system according to an exemplary embodiment of the present general inventive concept.
Figure 3:
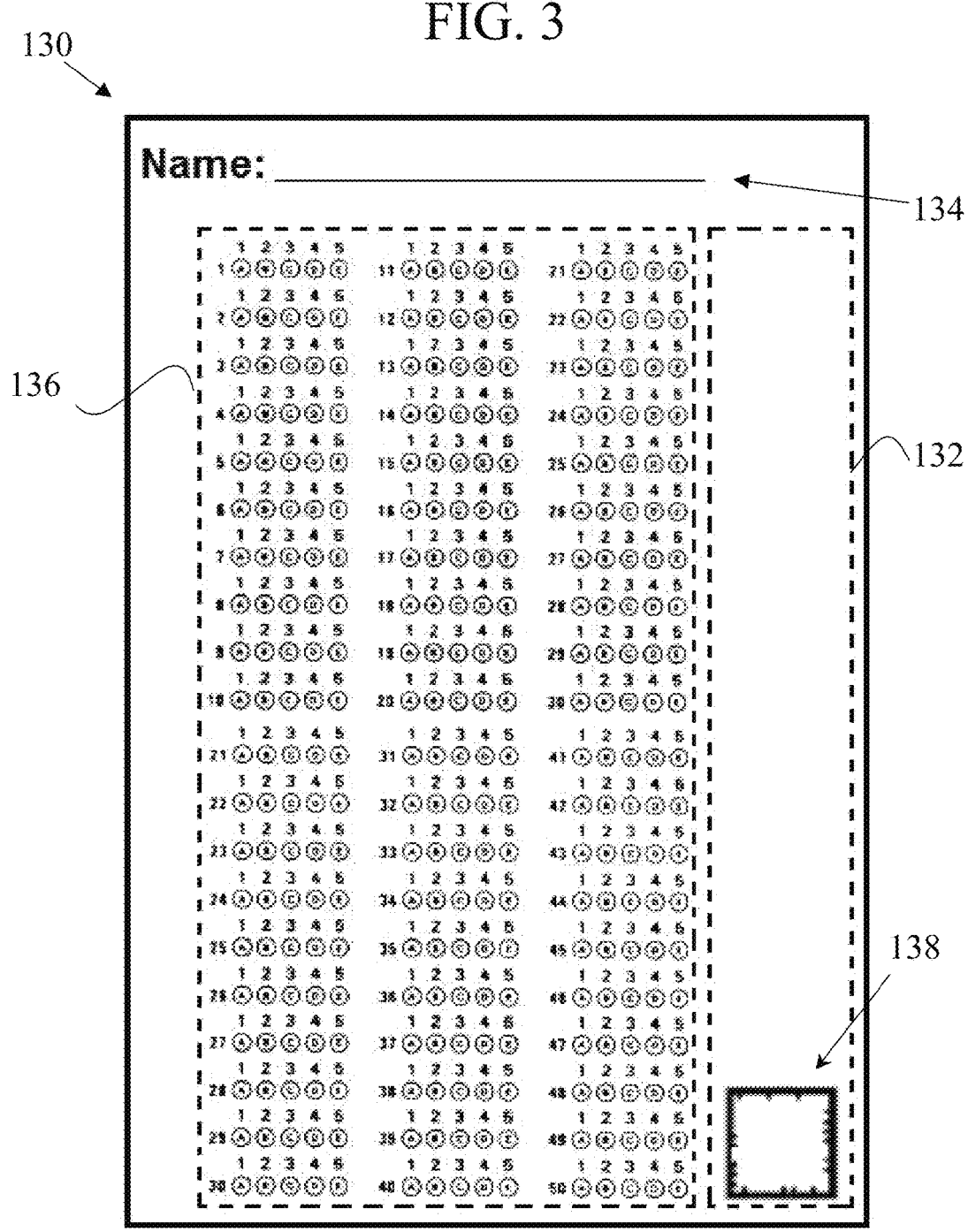
FIG. 3 illustrates a top plan view of a user-marked response sheet according to an exemplary embodiment of the present general inventive concept.
Figure 4:
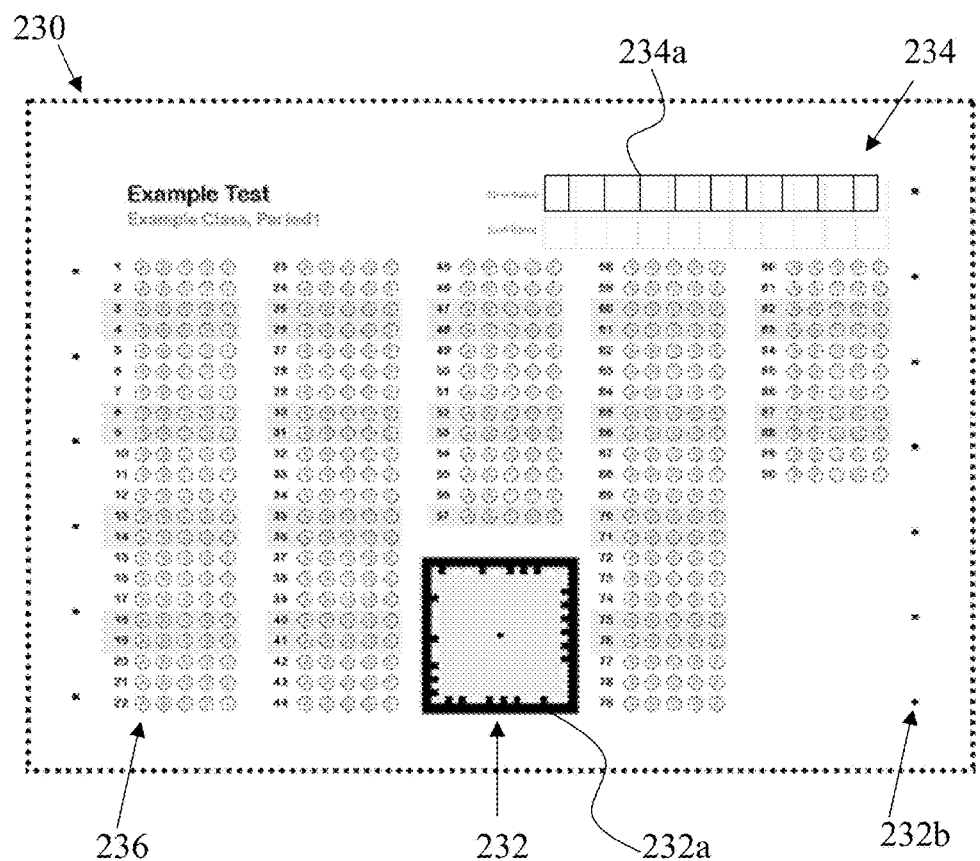
FIG. 4 illustrates a top plan view of a user-marked response sheet according to another exemplary embodiment of the present general inventive concept.

FIG. 2 illustrates a front perspective view of a non-fixed optical mark recognition system 100 according to an exemplary embodiment of the present general inventive concept. FIG. 3 illustrates a top plan view of a user-marked response sheet 130 according to an exemplary embodiment of the present general inventive concept. FIG. 4 illustrates a top plan view of a user-marked response sheet 230 according to another exemplary embodiment of the present general inventive concept.

Referring to FIG. 2, an exemplary embodiment of the non-fixed optical mark recognition system 100 includes a non-fixed image capturing device 110 and a computer software 120 running on a computer. In exemplary embodiments, the computer software 120 may be executed using the non-fixed image-capturing device 110. That is, the non-fixed image-capturing device 110 may function as a computer and as a digital camera. A user may use the non-fixed optical mark recognition system 100 to scan a user-marked response sheet 130 for evaluation, processing, and/or storage on the computer.

The method for using the non-fixed optical mark recognition system 100 according to the present general inventive concept allows an evaluator to use a hand-held image-capturing device 110 to scan the user-marked response sheet 130 from a non-fixed distance and/or orientation. As a result, a captured image of the user-marked response sheet 130 may be distorted due to lens imperfections of image-capturing device 110, or due to the orientation (i.e., camera angle) of image-capturing device 110 with respect to the user-marked response sheet 130 when the image was captured. Thus, the present general inventive concept provides a computer software 120 that locates positions of user created marks on the user-marked response sheet 130 based on a determined camera angle using identified image positions within 3 dimensional space to correct for the distortions and lens imperfections.

Referring to FIG. 2, the non-fixed optical mark recognition system 100 includes a non-fixed image-capturing device 110 running computer software 120 and a user-marked response sheet 130.

In exemplary embodiments, the non-fixed image-capturing device 110 may include a mobile device, a tablet, a digital camera, or various other hand-held devices, which include an image capturing function. However, the present general inventive concept is not limited thereto.

Referring to FIG. 3, the user-marked response sheet 130 according to an exemplary embodiment of the present general inventive concept includes an image marker region 132, a user-identification region 134, and a user-response region 136.

In exemplary embodiments, the marker region 132 includes an image marker 138, which is recognizable by the computer software 120 implementing a method for using the non-fixed optical mark recognition system 100. In exemplary embodiments, the image markers 138 may include a symbol or pattern which provides context to the user-marked response sheet 130. That is, the image marker 138 may be used to identify each user-marked response sheet 130, and/or a location of the marker region 132 or the user-response region 136. In exemplary embodiments, the image marker 138 may function identical to or substantially similar to a QR-code and include additional information.

Referring to FIG. 4, in alternative exemplary embodiments, the user-marked response sheet 230 includes an image marker region 232, a user-identification region 234, and a user-response region 236. The image marker region 232 may include an image marker 232*a* and a secondary image marker 232*b*. The secondary image markers 232*b* may be used to identify a position, location and/or orientation of the user-marked response sheet 230 within 3-dimensional space and various other information. The relative positions of the image markers 138, 232*a*, 232*b* within three-dimensional space may identify information regarding the user-marked response sheet 130, 230, such as user-marked response sheet version, course, student identification, or the like. The image markers 138, 232*a*, 232*b* may be designed such that the image marker's 138, 232*a*, 232*b* location within 3-dimensional space may be determined based on the pattern used.

In exemplary embodiments, the user identification region 134, 234 includes a field 134*a*, 234*a* wherein a user may record his or her identification information by text or by recording marks. In alternative exemplary embodiments, the user may record his or her user identification information within designated or boxed character regions 234*a*.

The user-response region 136, 236 may refer to an area within the user-marked response sheet 130, 230 in which a user may record response marks, including test data information or responses. In exemplary embodiments, the test data information may include a mark designating a selected answer or a text character or phrase (not illustrated). For example, the mark may include darkening a circle of a plurality circles representing possible responses to a particular test question. However, the present general inventive concept is not limited thereto.

In the present exemplary embodiment, the non-fixed optical mark recognition system 100 includes using a non-fixed image-capturing device 110 which may be used to obtain or capture an image of the user-marked response sheet 130. The image-capturing device 110 may include a hand-held digital camera, a mobile device having a means for capturing an image or the like. However, the present general inventive concept is not limited thereto. That is, the method according to the present general inventive concept may be performed using a fixed or a non-fixed image-capturing device 110.

Figure 5:
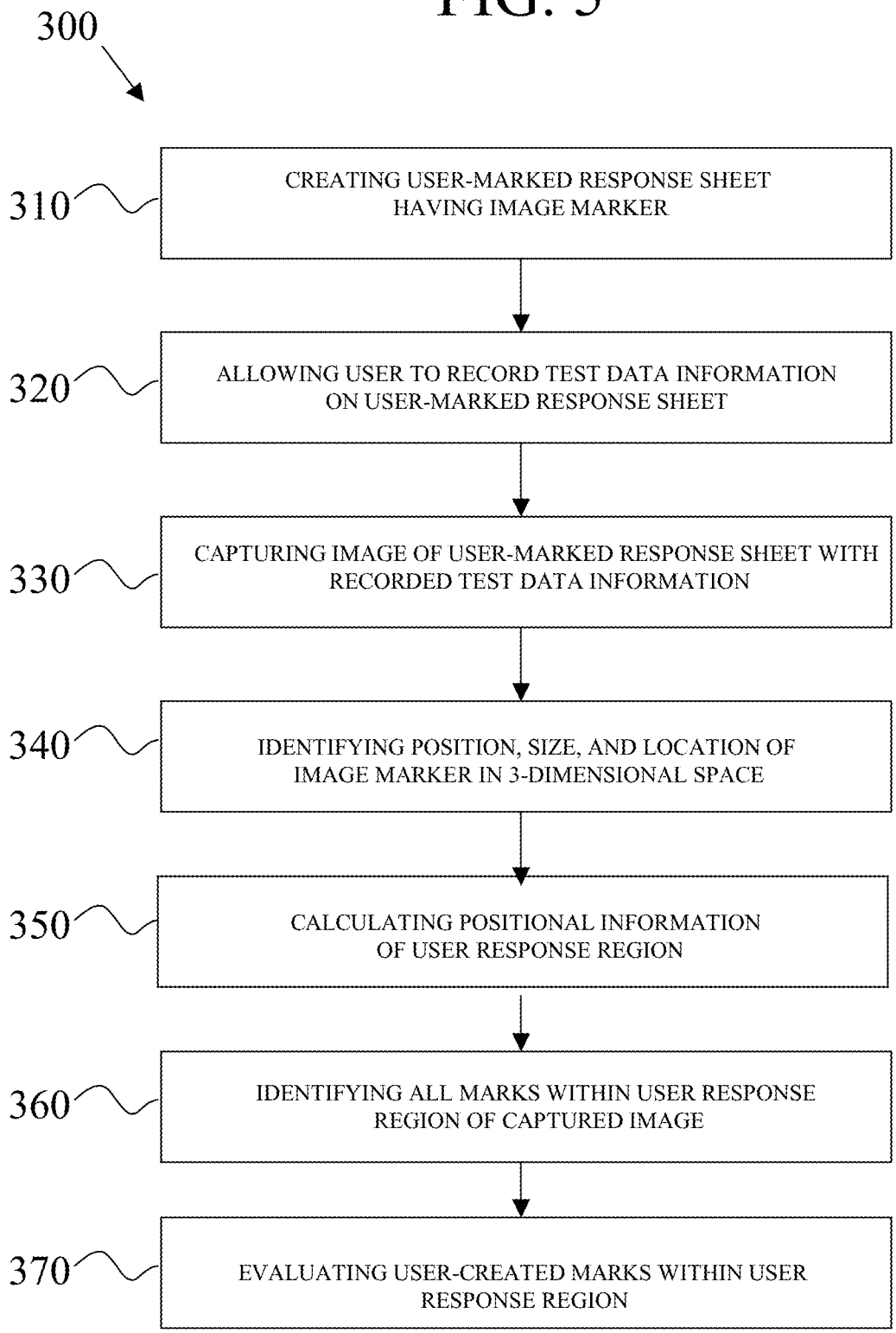
FIG. 5 illustrates a flow chart of a non-fixed optical mark recognition method according to an exemplary embodiment of the present general inventive concept.

FIG. 5 illustrates a flow chart of a non-fixed optical mark recognition method 300 according to an exemplary embodiment of the present general inventive concept. FIG. 5 illustrates a process for evaluating a user-marked response sheet 130 according to the present general inventive concept.

At step 310, a user-marked response sheet 130 which includes an image marker region 132, a user-identification region 134, and a user-response region 136 is generated. The image marker region 132 includes at least one specifically designed image marker 138 which may include document identification information such as document layout information, document identification information, user identification information, and alignment information of the user-marked response sheet 130. The document layout information may include location information of the user-identification region 134 and/or the user-response region 136 relative to the image marker 138. The user identification information may include a user or test taker's name, or other user specific identification information. However, the present general inventive concept is not limited thereto. In exemplary embodiments, the user-marked response sheet 130 may include secondary alignment markers to provide further document alignment information.

At step 320, a user is allowed to mark responses (i.e., test data information) within the user-response region 136. That is, the user is allowed to record marks which may correspond to answers to a provided test or questions. However, the present general inventive concept is not limited thereto.

At step 330, a digital image of the user-marked response sheet 130, including the user marked In exemplary embodiments, the correct and incorrect answers may be displayed as an overlay on an image of the user-marked response sheet 130, in real-time. That is, as the non-fixed image-capturing device 110 is displaying an image of the user-marked response sheet 130, prior to capturing or recording the image, the computer software 120 performs steps 340, 350, 360, and 370, in real-time, and displays the results on the displayed image. The correct and incorrect answers may be displayed as colored marks which correspond to an orientation and/or angle of the viewed user-marked response sheet 130. In addition, a percentage of correct answers may be calculated and displayed on the displayed image, in real-time.

responses, is obtained using a non-fixed image-capturing device 110 or various other means for capturing an image of the user-marked response sheet 130. In exemplary embodiments, the means for capturing an image may include a mobile device, a tablet, a digital camera, or various other hand-held devices, which include an image capturing function. However, the present general inventive concept is not limited thereto. That is, the means for capturing an image may include a wearable camera having a visual feedback system to provide an image having an overlay to the user. The image may be displayed through wearable display device.

In the present exemplary embodiment, a computer software 120 stored on a mobile device 110 is executed to capture an image of the user-marked response sheet 130. Further, while the user-marked response sheet 130 is viewed using the mobile device 110, the image marker 138 is detected and identification information encoded therein may be displayed on the mobile device 110. The identification information may include document layout information, document identification information, user identification information, and/or alignment information of the user-marked response sheet 130. However, the present general inventive concept is not limited thereto.

At step 340, positional information of the image marker 138 within the captured image is identified. In exemplary embodiments, a position, size, and location of the image marker 138 is identified in 3-dimensional space. The process to identify image markers 138 may correspond to a type of image marker used, which are determined by using image analysis or various other computer vision techniques. In exemplary embodiments, the computer software 120 may identify a type of image marker within the captured image and use a corresponding process to identify, locate, and obtain information from the image marker 138.

At step 350, positional information of the user-response region 136 relative to the identified 3-dimensional positional information of the image marker 138 is calculated. In exemplary embodiments, locations of all designated user-response regions are calculated relative to the identified 3-dimensional positional information of the image marker 138.

At step 360, all user created marks within the user-response region 136 are identified according to pixel-value data. That is, all pixel-values within the user-response region 136 in the captured image are analyzed and compared to known pixel-values of the user-response region 136, before the user is allowed to mark the user-marked response sheet 130. In exemplary embodiments, a filter may be used to enhance contrast and definition of the pixel-values. The computer software 120 may identify, process, and analyze bubble type marks within the user-response region 136.

In exemplary embodiments, a user-response region 136 that requires a written response from a user may be processed by using an external device. For instance, the computer software 120 may recognize handwritten responses from the analyzed pixel-value data and may transmit this pixel-value data to an external device or server for handwriting recognition. In an exemplary embodiment, the non-fixed image-capturing device 110 may communicate either wirelessly or through a wired connection to an online server or computer system to perform handwriting recognition of the captured image or the pixel-value data. The online server or computer system may conduct handwriting recognition on the captured image or the pixel-value data and return the resulting characters to the non-fixed image-capturing device 110. However, the present general inventive concept is not limited thereto. That is, in exemplary embodiments, the computer software 120 operating on the non-fixed image-capturing device 110 may also conduct handwriting recognition of the captured image or the pixel-value data.

At step 370, the processed user created marks within the user-response region 136 are compared to a predefined template. The predefined template may include correct answers within the user-response region 136 of the user-marked response sheet 130. In an exemplary embodiment, the pixel-value data of a user marked user-response region 136 (i.e., user answers) is compared to pixel value data of the predefined answer template (i.e., template answers). User answers corresponding to the correct answers will be identified as a correct answer and indicated in a first color (i.e., green) on the non-fixed image-capturing device 110. Conversely, user answers which do not correspond with the template answers will be identified as an incorrect answer and indicated in a second color (i.e., red).

In exemplary embodiments, the non-fixed optical mark recognition method 300 provides real-time feedback on the non-fixed image-capturing device 110 based on an identification and analysis of user created marks on a user-marked response sheet 130. The non-fixed optical mark recognition system 300 overlays a calculated percentage and correct and incorrect answers on a displayed image of the user-marked response sheet 130 to thereby confirm identified user-created marks. In exemplary embodiments, the results overlay may utilize augmented reality techniques. However, the present general inventive concept is not limited thereto.

Figure 6:
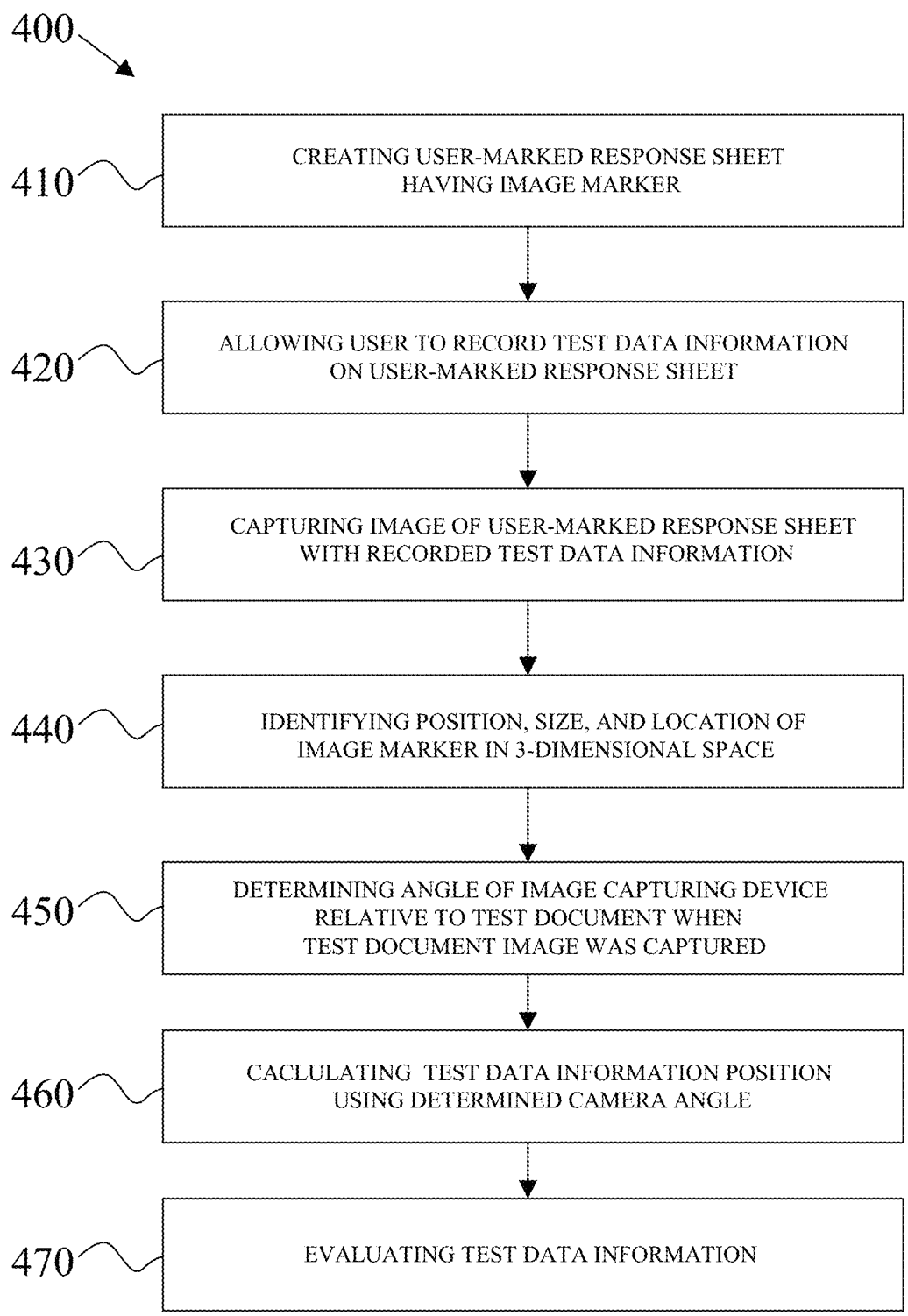
FIG. 6 illustrates a flow chart of a non-fixed optical mark recognition method according to another exemplary embodiment of the present general inventive concept.
Figure 7:
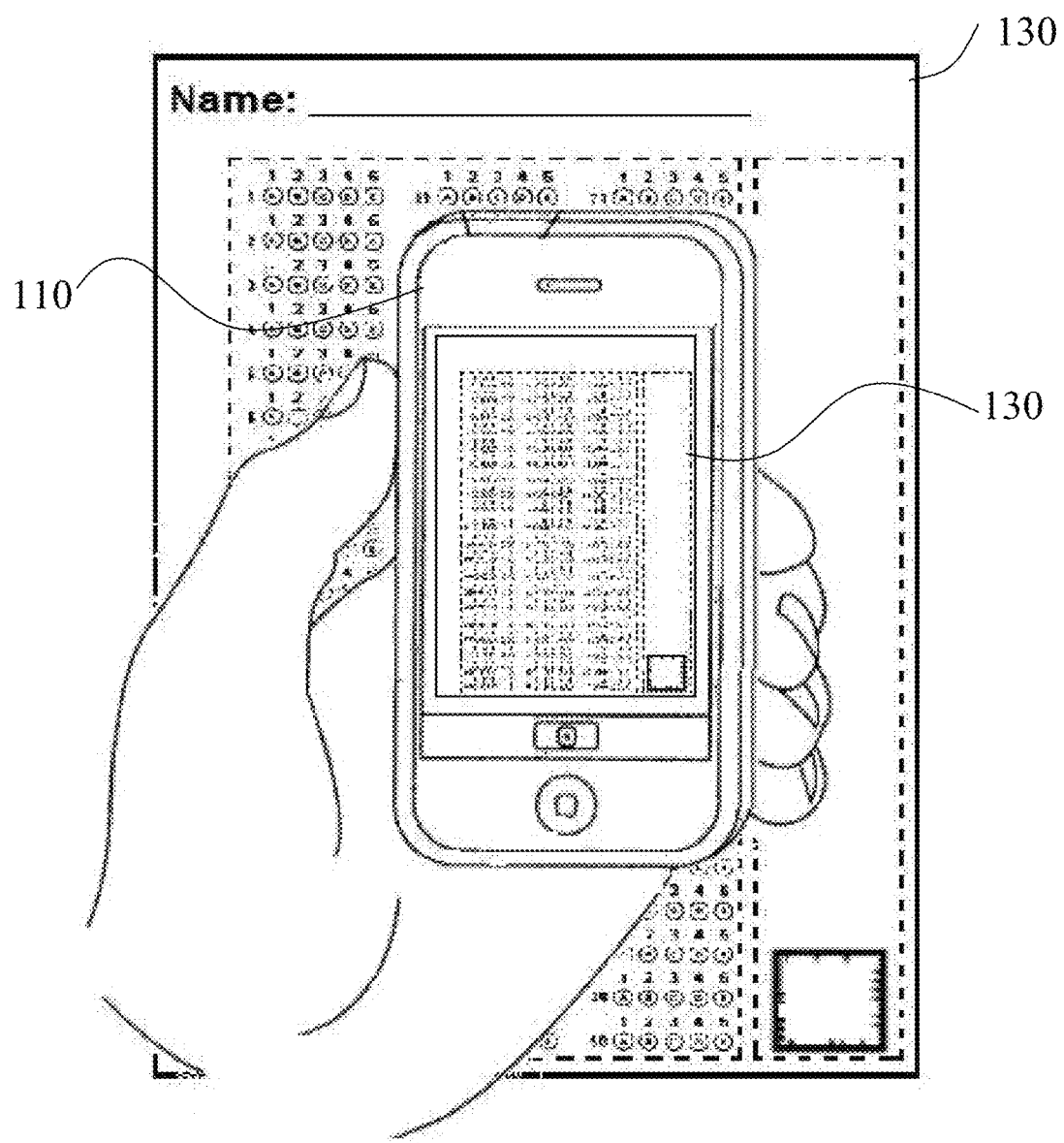
FIG. 7 illustrates a front perspective view of the non-fixed optical mark recognition system of FIG. 2 in operation, according to an exemplary embodiment of the present general inventive concept.
Figure 8:
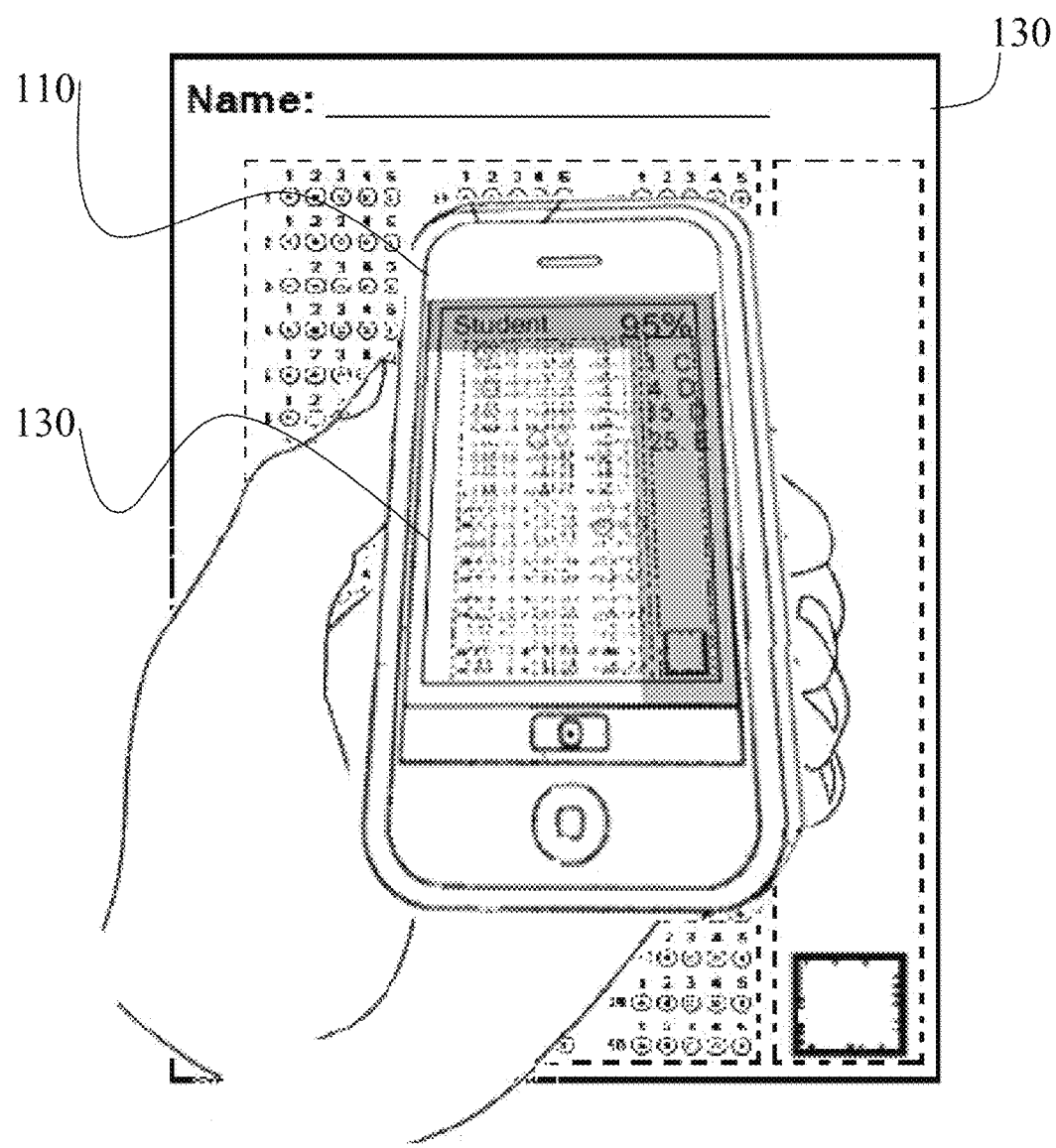
FIG. 8 illustrates a front perspective view of the non-fixed optical mark recognition system of FIG. 2 in operation having a skewed capture angle, according to an exemplary embodiment of the present general inventive concept.
Figure 9:
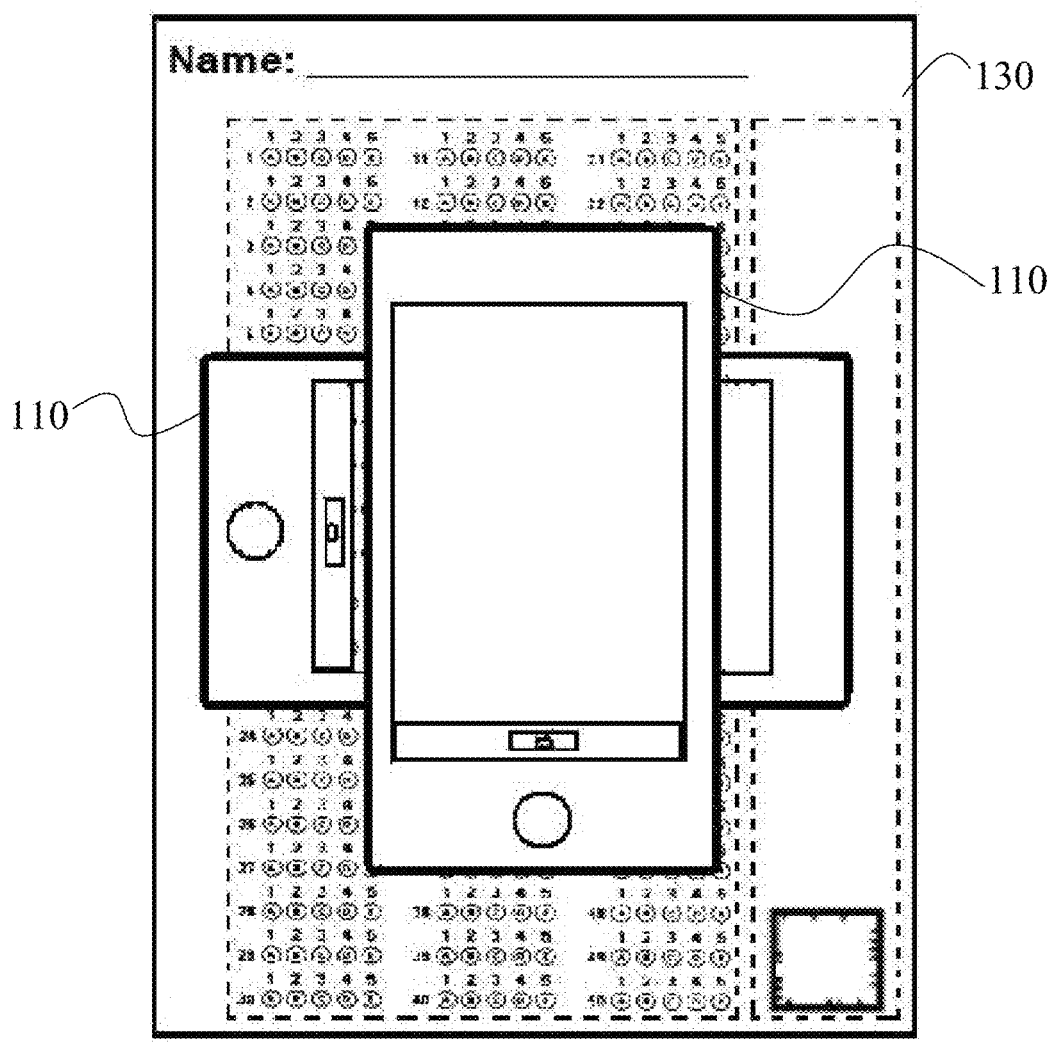
FIG. 9 is a plan view of the non-fixed optical mark recognition system of FIG. 2 illustrating a range of planar orientations of the non-fixed capture device with respect to the user-marked response sheet according to an exemplary embodiment.
Figure 10:
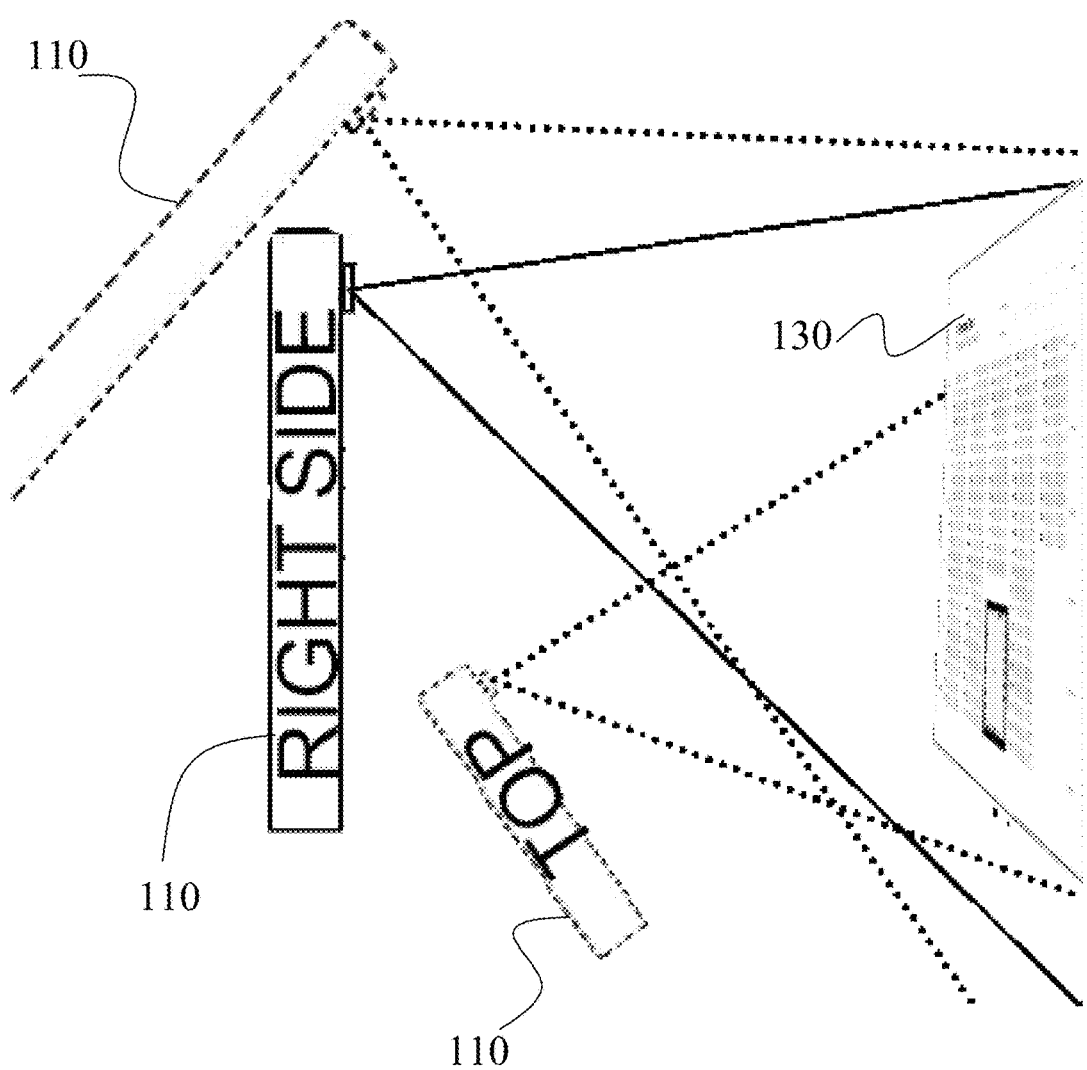
FIG. 10 is a schematic view of the non-fixed optical mark recognition system of FIG. 2 illustrating a range of angular orientations of the non-fixed capture device with respect to the user-marked response sheet according to an exemplary embodiment.
Figure 11:
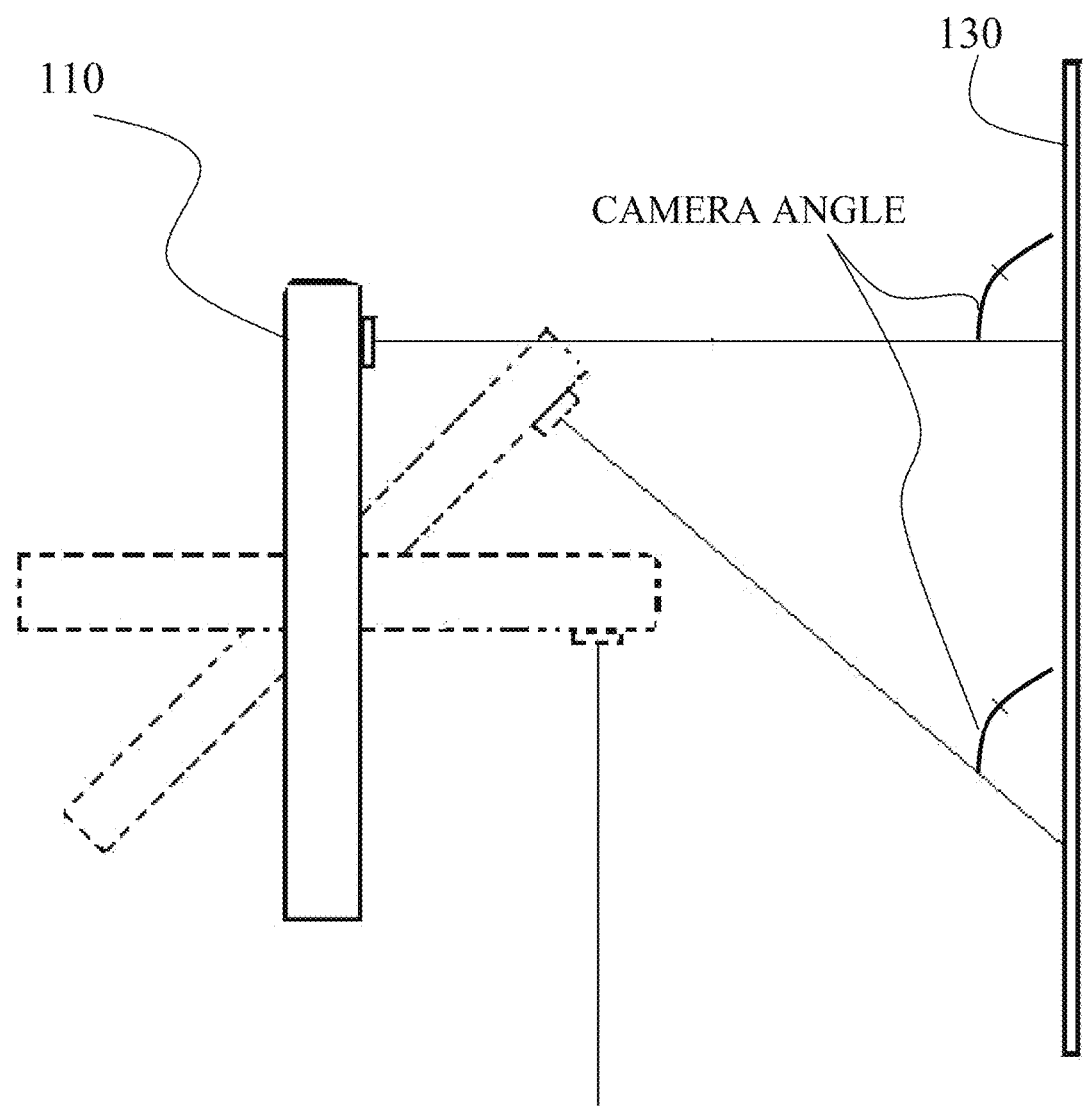
FIG. 11 is a side view of the non-fixed optical mark recognition system of FIG. 2 illustrating a range of angular orientations of the non-fixed capture device with respect to the user-marked response sheet according to an exemplary embodiment.
Figure 12:
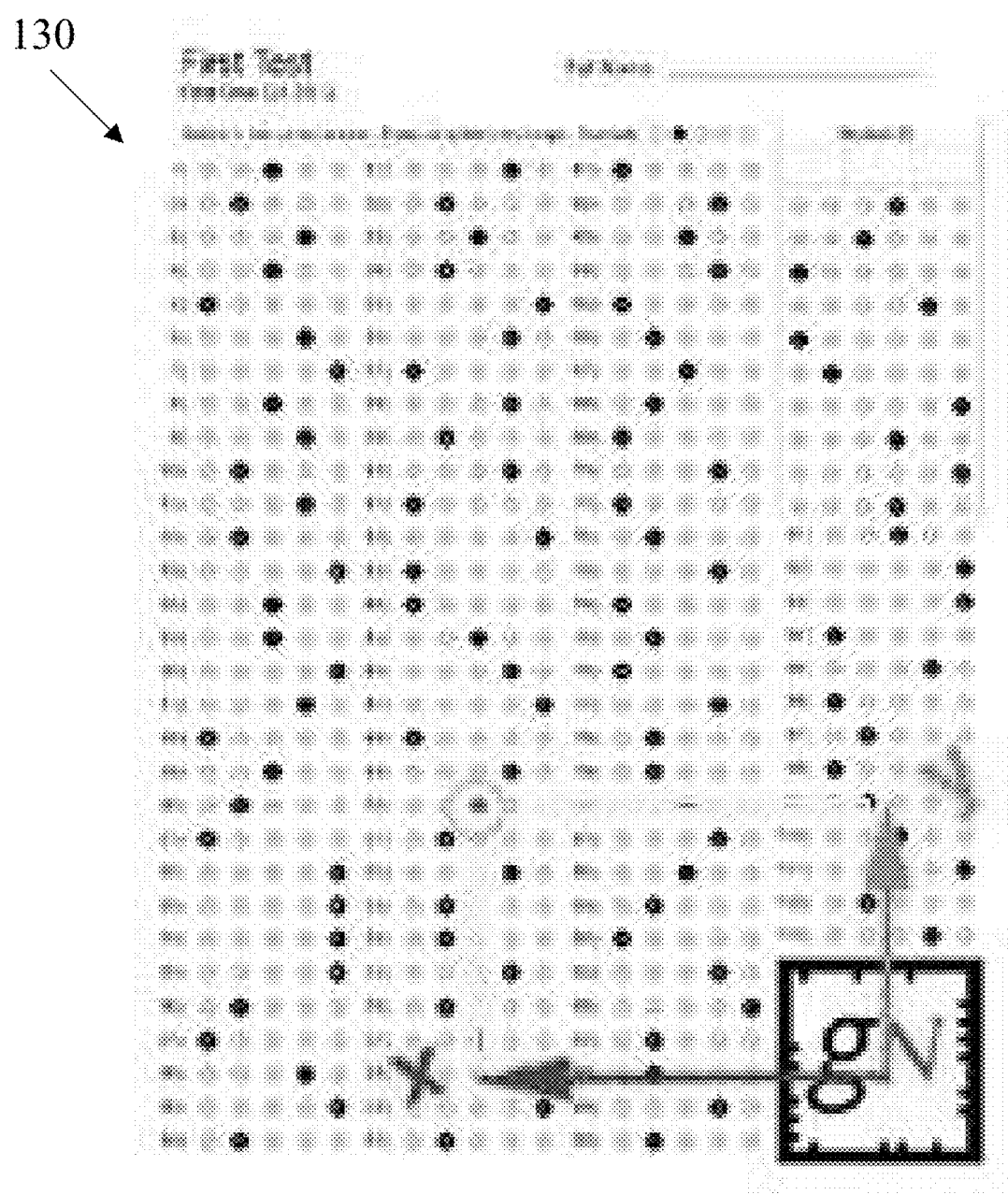
FIG. 12 illustrates identification of the orientation of an image marker in 3-dimensions according to an exemplary embodiment of the present general inventive concept.

FIG. 6 illustrates a flow chart of a non-fixed optical mark recognition method 400 according to another exemplary embodiment of the present general inventive concept. In the present exemplary embodiment, the method further includes the following steps.

At step 410, a user-marked response sheet 130 which includes an image marker region 132, a user-identification region 134, and a user-response region 136 is generated. The image marker region 132 includes at least one specifically designed image marker 138 which may include document identification information such as document layout information, document identification information, user identification information, and alignment information of the user-marked response sheet 130.

At step 420, a user is allowed to mark responses (i.e., test data information) within the user-response region 136. That is, the user is allowed to record marks which may correspond to answers to a provided test or questions. However, the present general inventive concept is not limited thereto.

At step 430, a digital image of the user-marked response sheet 130, including the user marked responses, is obtained using a non-fixed image-capturing device 110 or various other means for capturing an image of the user-marked response sheet 130. In exemplary embodiments, the means for capturing an image may include a mobile device, a tablet, a digital camera, or various other hand-held devices, which include an image capturing function. However, the present general inventive concept is not limited thereto.

At step 440, positional information of the image marker 138 within the captured image is identified. In exemplary embodiments, a position, size, and location of the image marker 138 is identified in 3-dimensional space. The process to identify image markers 1238 may correspond to a type of image marker used, which are determined by using image analysis. In exemplary embodiments, the computer software 120 may identify a type of image marker within the captured image and use a corresponding process to identify, locate, and obtain information from the image marker 138.

At step 450, an orientation and/or camera angle of the image capturing device with respect to the user-marked response sheet 130 is calculated. This calculation may based on the identified positional information of the image marker 138 within the captured image.

At step 460, all user created marks within the user-response region 136 are identified according to the calculated orientation and/or camera angle.

At step 470, the processed user created marks within the user-response region 136 are compared and/or evaluated with respect to a predefined template. The predefined template may include correct answers within the user-response region 136 of the user-marked response sheet 130. In an exemplary embodiment, the pixel-value data of a user marked user-response region 136 (i.e., user answers) is compared to pixel value data of the predefined answer template (i.e., template answers). User answers corresponding to the correct answers will be identified as a correct answer and indicated in a first color (i.e., green) on the non-fixed image-capturing device 110. Conversely, user answers which do not correspond with the template answers will be identified as an incorrect answer and indicated in a second color (i.e., red).

In exemplary embodiments, the correct and incorrect answers may be displayed as an overlay on an image of the user-marked response sheet 130, in real-time. That is, as the non-fixed image-capturing device 110 is displaying an image of the user-marked response sheet 130, prior to capturing or recording the image, the computer software 120 performs steps 340, 350, 360, and 370, in real-time, and displays the results on the displayed image. The correct and incorrect answers may be displayed as colored marks which correspond to an orientation and/or angle of the viewed user-marked response sheet 130. In addition, a percentage of correct answers may be calculated and displayed on the displayed image, in real-time.

In exemplary embodiments, the non-fixed optical mark recognition method 300 provides real-time feedback on the non-fixed image-capturing device 110 based on an identification and analysis of user created marks on a user-marked response sheet 130. The non-fixed optical mark recognition system 300 overlays a calculated percentage and correct and incorrect answers on a displayed image of the user-marked response sheet 130 to thereby confirm identified user-created marks. In exemplary embodiments, the results overlay may utilize augmented reality techniques. However, the present general inventive concept is not limited thereto.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet).

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. System for evaluating a user-marked document having a response area and at least one image marker, the system comprising:
   an image capturing device to obtain a digital image of the user-marked document; and
   a computer to identify positional information of the at least one image marker from the obtained digital image of the user-marked document,
   wherein the image marker includes one of an image, a pattern, a symbol, a number, a border, or one or more text characters and provides context to marks on the user-marked document based on the position of the mark relative to the image marker, and
   wherein the positional information of the at least one image marker is determined based on a pattern within the image marker.

2. The system of claim 1, wherein the image marker provides context to marks on the user-marked document based on the position of the mark relative to the image marker in 3-dimensional space.

3. The system of claim 2, wherein the computer calculates positions of the marks relative to the image marker based on the marks position in 3-dimensional space.

4. The system of claim 3, further comprising an algorithm stored within the computer to convert coordinates of the plane of the image marker to location of pixels within the obtained digital image of the user-marked document.

5. The system of claim 3, wherein the calculated positions of the marks relative to the image marker correspond to user data response to survey questions.

6. The system of claim 1, wherein the context includes one of position information of the response area, information data of a user of the user-marked document, and information data of the user-marked document.

7. The system of claim 1, wherein the positional information of the image marker includes position, size, location, and plane of the image marker in 3-dimensional space relative to the image capturing device.

8. The system of claim 1, wherein the computer determines a camera angle at which the digital image of the user-marked document was obtained based on a relative distortion of the image marker.

9. The system of claim 1, wherein the computer identifies pixel-value data of marks within the response area.

10. The system of claim 9, wherein the computer determines a presence, darkness or a color of marks within the response area based on the identified pixel-value data of the marks.

11. The system of claim 10, wherein the computer further augments the obtained digital image of the user-marked document with a color corresponding to the identified pixel-value data of the marks.

12. The system of claim 11, wherein the image capturing device displays an augmented reality view of the obtained digital image of the user-marked document overlaid with the color corresponding to the identified pixel-value data of the marks within the response area.

13. The system of claim 10, wherein the computer further augments the obtained digital image of the user-marked document with an image corresponding to the identified pixel-value data of the marks.

14. The system of claim 13, wherein the image capturing device displays an augmented reality view of the obtained digital image of the user-marked document overlaid with a 3-D rendering corresponding to the identified pixel-value data of the marks within the response area.

15. The system of claim 1, further comprising a gyroscope to determine a camera angle between the image capturing device and the image marker.

16. The system of claim 15, wherein the image capturing device obtains the digital image of the user-marked document when the camera angle is determined by the gyroscope to be stable to reduce image blur.

17. The system of claim 1, wherein the computer compares frames of the digital image obtained by the image capturing device to detect and reduce image blur.

* * * * *